(12) United States Patent
Sukumar et al.

(10) Patent No.: US 10,127,292 B2
(45) Date of Patent: Nov. 13, 2018

(54) KNOWLEDGE CATALYSTS

(71) Applicant: UT-Battelle, LLC, Oak Ridge, TN (US)

(72) Inventors: Sreenivas R. Sukumar, Oak Ridge, TN (US); Regina K. Ferrell, Oak Ridge, TN (US); Mallikarjun Shankar, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 546 days.

(21) Appl. No.: 14/089,395

(22) Filed: Nov. 25, 2013

(65) Prior Publication Data

US 2014/0156591 A1    Jun. 5, 2014

Related U.S. Application Data

(60) Provisional application No. 61/732,447, filed on Dec. 3, 2012.

(51) Int. Cl.
*G06F 17/30* (2006.01)

(52) U.S. Cl.
CPC ............... *G06F 17/30563* (2013.01)

(58) Field of Classification Search
CPC .............. G06F 17/30578; G06F 17/3061
USPC .......................................................... 707/602
See application file for complete search history.

(56) References Cited

U.S. PATENT DOCUMENTS

| 6,199,059 | B1 | 3/2001 | Dahan et al. | |
|---|---|---|---|---|
| 7,007,029 | B1 | 2/2006 | Chen | |
| 7,177,864 | B2 | 2/2007 | Ekhaus | |
| 7,249,135 | B2 | 7/2007 | Ma et al. | |
| 7,299,216 | B1 * | 11/2007 | Liang | G06F 11/0727 |
| 7,319,996 | B2 | 1/2008 | Chen et al. | |
| 7,630,956 | B2 | 12/2009 | Wyatt et al. | |
| 2002/0055932 | A1 * | 5/2002 | Wheeler | G06F 17/30557 |
| 2003/0177137 | A1 * | 9/2003 | MacLeod | G06F 17/30306 |
| 2005/0234889 | A1 | 10/2005 | Fox et al. | |

(Continued)

OTHER PUBLICATIONS

Bennett, Travis A. et al., "Bridging the Data Integration Gap: From Theory to Implementation," ACM SIGSOFT Software Engineering Notes, vol. 36, No. 3, May 2011, pp. 1-8.

(Continued)

*Primary Examiner* — Tarek Chbouki
*Assistant Examiner* — Eddy Cheung
(74) *Attorney, Agent, or Firm* — Brinks Gilson & Lione (57) ABSTRACT

A computer implemented method integrates data from remote disparate data sources by processing a non-transitory media. The non-transitory media stores instructions for detecting data sets in different formats hosted in a plurality of heterogeneous databases that are accessible through a distributed network. The method extracts schema data from the plurality of heterogeneous databases and identifies related fields in two or more of the heterogeneous databases. The method links the related fields in the two or more of the plurality of heterogeneous databases and makes the data accessible through a virtual warehouse. As schemas change, as new data sources and analysis artifacts are created, the computer implemented method and system can act as a meta-data store, a provenance tracking device, and/or a knowledge management service.

20 Claims, 5 Drawing Sheets

(5 of 5 Drawing Sheet(s) Filed in Color)

(56) References Cited

U.S. PATENT DOCUMENTS

| | | | |
|---|---|---|---|
| 2005/0256850 A1* | 11/2005 | Ma | G06F 17/30731 |
| 2006/0064667 A1* | 3/2006 | Freitas | G06F 8/35 717/104 |
| 2006/0100912 A1* | 5/2006 | Kumar | G06F 17/30864 705/4 |
| 2006/0136452 A1 | 6/2006 | Lim et al. | |
| 2006/0242604 A1* | 10/2006 | Wong | G06F 17/30126 715/854 |
| 2007/0204001 A1* | 8/2007 | Hoopes | G06F 17/30011 709/217 |
| 2007/0239769 A1* | 10/2007 | Fazal | G06F 17/30554 |
| 2008/0021912 A1 | 1/2008 | Seligman et al. | |
| 2008/0253306 A1* | 10/2008 | Manion | H04L 45/02 370/255 |
| 2009/0063517 A1* | 3/2009 | Wright | G06F 17/30274 |
| 2009/0228463 A1* | 9/2009 | Cramer | G06F 19/705 |
| 2009/0234869 A1* | 9/2009 | Azvine | G06F 17/30292 |
| 2009/0319544 A1* | 12/2009 | Griffin | G06F 17/30557 |
| 2009/0319546 A1* | 12/2009 | Shaik | G06F 17/30563 |
| 2010/0057745 A1 | 3/2010 | Li | |
| 2010/0293194 A1* | 11/2010 | Andersen | G06K 9/0014 707/772 |
| 2010/0332453 A1* | 12/2010 | Prahlad | G06F 11/1458 707/640 |
| 2011/0184896 A1* | 7/2011 | Guyon | G06F 19/24 706/12 |
| 2011/0219028 A1 | 9/2011 | Dove et al. | |
| 2011/0295794 A1* | 12/2011 | Venkatasubramanian | G06F 17/30563 707/602 |
| 2011/0295795 A1* | 12/2011 | Venkatasubramanian | G06F 17/30563 707/602 |
| 2012/0109879 A1* | 5/2012 | Devadoss | G06F 17/30563 707/602 |
| 2012/0150791 A1* | 6/2012 | Willson | G06F 17/30563 707/600 |
| 2012/0265726 A1* | 10/2012 | Padmanabhan | G06F 17/303 707/602 |
| 2012/0324387 A1* | 12/2012 | Rausch | G06F 17/30563 715/771 |
| 2013/0132163 A1* | 5/2013 | Eder | G06Q 40/00 705/7.37 |

OTHER PUBLICATIONS

Fact Sheet: Big Data Across the Federal Government, Office of Science and Technology Policy, Executive Office of the President of the United States, 2012, 14 pages.

Hey, Tony et al., *The Fourth Paradigm: Data-Intensive Scientific Discovery*, Microsoft Research, Redmond, WA, 2009, 287 pages.

Mace, Scott, "Berwick on Analytics: Technology is Ready, But Doctors Need Help," HealthLeaders Media, 2012, printed from the internet at <http://www.healthleadersmedia.com/page-1/TEC-280126/Berwick-on-Analytics-Technology-Is-Ready-but-Doctors-Need-Help##>, on Jun. 9, 2015, 6 pages.

Manyika, James et al., "Big Data: The Next Frontier for Innovation, Competition, and Productivity," McKinsey Global Institute Report, 2011, printed from the internet at <http://www.mckinsey.com/insights/business_technology_/big_data_the_next_frontier_for_innovation>, on Jun. 9, 2015, 2 pages.

Rahm, Erhard et al., "A Survey of Approaches to Automatic Schema Matching," VLDBJ Journal, 2001, vol. 10, pp. 334-350.

Vesset, Dan et al., "Worldwide Big Data Technology and Services 2012-2015 Forecast," Market Analysis by IDC Corp., IDC #233485, 2012, 34 pages.

Yasin, Rutrell, "CMS Taps Analytics to Examine Big Health Care Data," GCN, 2012, printed from the internet at < http://gcn.com/articles/2012/03/09/cms-analytics-project-health-care-big-data.aspx>, on Jun. 9, 2015, 3 pages.

* cited by examiner

KNOWLEDGE CATALYSTS

PRIORITY CLAIM

This application claims the benefit of priority from U.S. Provisional Application No. 61/732,447 filed Dec. 3, 2012, entitled "Knowledge Catalysts: Enabling and Exploring Discovery from Big Data", which is incorporated herein by reference.

STATEMENT REGARDING FEDERALLY SPONSORED RESEARCH AND DEVELOPMENT

The invention was made with United States government support under Contract No. DE-AC05-00OR22725 awarded by the United States Department of Energy. The United States government has certain rights in the invention.

BACKGROUND

Technical Field

This disclosure relates to data integration of large data sets and more specifically to a unified approach that makes data accessible from dissimilar resources.

Related Art

As the availability of data continues to grow, automatic access to different data sets is challenging. Electronic data may be stored in distributed resources with different schemas, formats, and structures. Before data mining may process distributed data the systems must resolve representation conflicts, naming conflicts, format conflicts, etc. A representation conflict may involve objects that are identified through different attributes. For example, a field identified as email in a first schema may be identified as an address in a second schema. Naming conflicts may arise when records refer to the underlying entities in multiple ways or where the same name identifies different information. And, different formats or abbreviations may be used to identify the same underlying entities.

Some processes attempt to resolve these integration problems sequentially and independently, allowing errors to pass on uncorrected from one integrating step to the next. Other processes attempt to consolidate the data from all of the different sources into a single repository requiring extensive processing, scaling, searching, and large memories.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

A unified data integration system assists analysts explore disparate data in a seamless architecture. The system detects and analyzes datasets in different formats (structured, unstructured), hosted across similar and different infrastructures (cloud, custom-hardware, etc.), that may be stored in different database structures (row-oriented, column oriented, file-oriented etc.) and in different schemas. The systems capture schema and data-element relationships across data sources and in some systems track the data elements access and in some systems processing within and outside of an enterprise based on the queries and the analytical artifacts created when processing the data. The system may digitally record and store institutional domain knowledge and data elements in a database and memory within the enterprise. Some systems integrate and virtually link billions of records, thousands of data elements, and/or hundreds of tables from several data sources hosted by different servers and clusters. The systems may virtually integrate data from legacy sources such as data generated from mainframes with data generated from modern sources.

Figure 1:
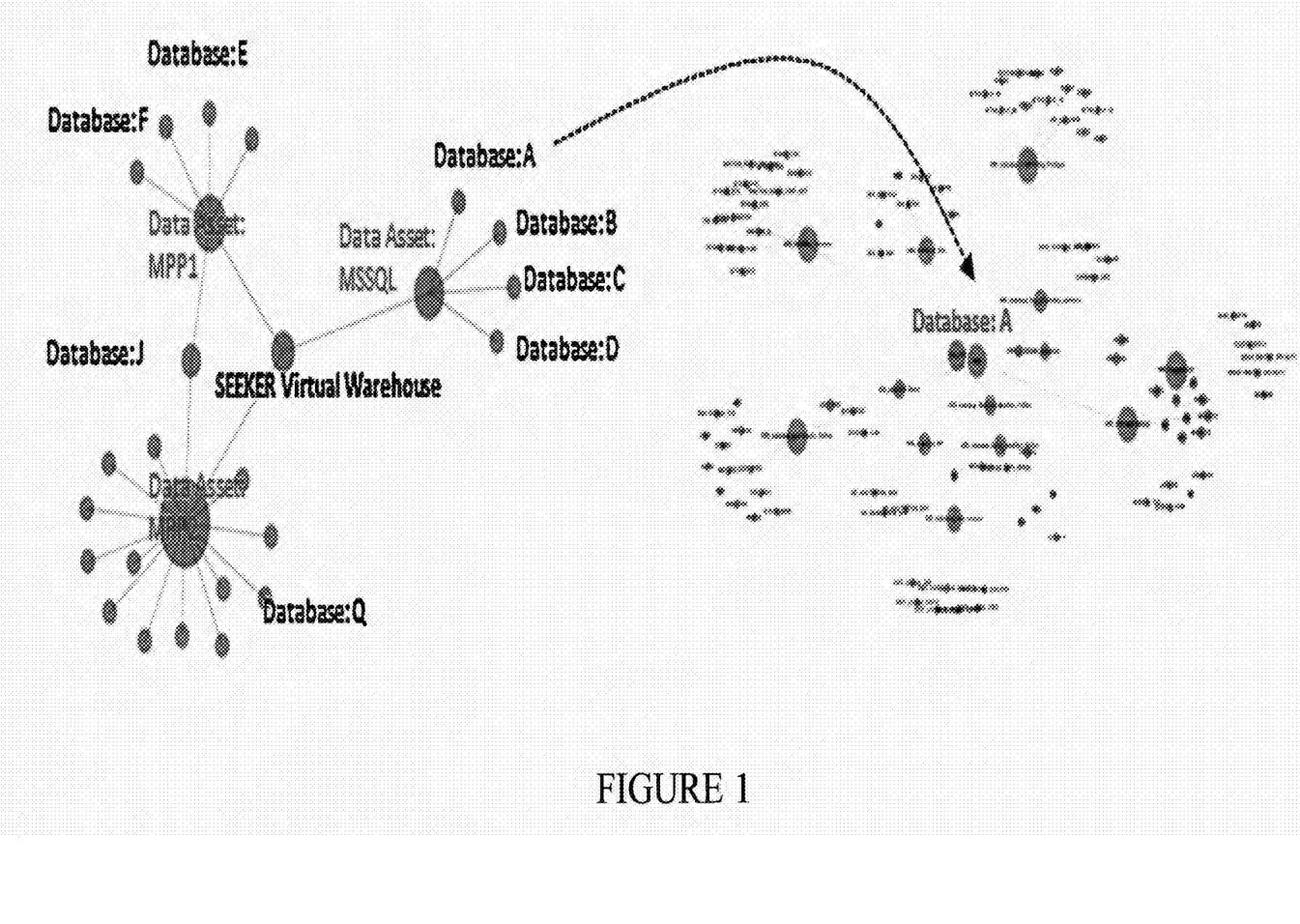
FIG. 1 shows the associations that comprise the virtual warehouse that comprises a plurality of data sources within and across an enterprise.

The unified data integration system may (1) extract the schema, table and field structures from databases hosted in private, commercial, and open source databases, (2) identify related fields through fuzzy logic across data schemas stored in a plurality of heterogeneous databases, (3) graphically display relationship links for interactive visual exploration and real-time acceptance or modifications by analyst that may be made on a touch sensitive or gesture controlled display and may (4) capture, share, and publish collaborative discussions about the data and meta-data. The unified data integration system automatically extracts or scrapes schema information from local and/or remote distributed databases and builds a metadata dictionary or metadata repository that may be interactively accessed, observed, browsed, processed, etc., as shown in FIG. 1.

The database structures may support a database sublanguage (e.g., structured query language, for example) that may be used for querying, updating, and managing data stored in a local or remote distributed memory or database. The databases may be accessible through a publicly accessible (or private) distributed network coupled to the unified data integration systems and a database engine through an Application Program Interface (API) that handles requests for database actions and controls database security and data integrity requirements. A cloud or cloud based computing system may serve the databases and may refer to a scalable platform that provides a combination of services including computing, durable storage of both structured and unstructured data, network connectivity and other services. The metered services provided by a cloud or cloud based computing may be interacted with (provisioned, de-provisioned, or otherwise controlled) via one or more APIs coupled to the unified data integration system.

Some metadata dictionaries or metadata repositories store information about data including evolving schemas and institutional domain knowledge that are captured and stored in real-time in a memory or through a batch scraping process. A real-time operation comprises an operation matching a human's perception of time or a virtual process that is processed at the same rate (or perceived to be at the same rate) as a physical or an external process. The physical or external process is defined by the computing session in which data is received and/or processed. A metadata dictionary or metadata repository may store information about content, its format, relationships to other content, schemas, file specifications, locations, programs that may access the content, and/or etc. Some systems access data served through clusters that may use Microsoft SQL servers, Oracle, and Greenplum, and open source storage tools like Apache Hadoop and MySQL. The metadata dictionary or repository may emulate or comprise a virtual warehouse that serves data sources across remote and local data assets of interest.

Analysts may interact with all or some of the databases through the metadata dictionary or repository as if the content was hosted in a local centralized warehouse. The unified data integration system allows the analysts to explore the entity relationship structures of the databases and allows users to interpret previously unseen schemas that may be required for such analysis and to understand where one or more key elements may be located within a new dataset. A visualization display rendered by the unified data integration system may automatically identify a table, the primary keys, and the foreign keys within the schema if that information was not previously provided.

Figure 2:
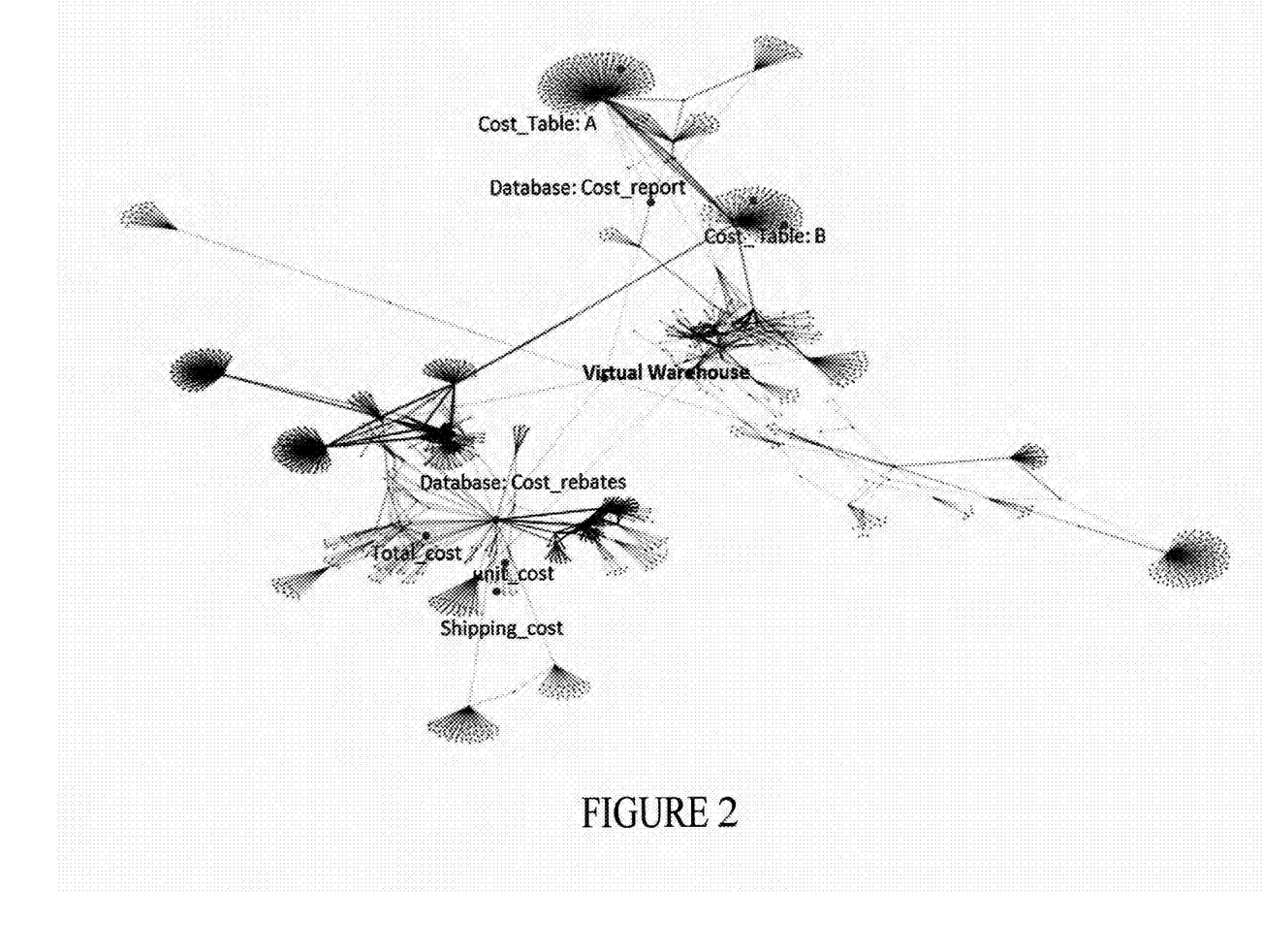
FIG. 2 shows a visual representation of an exemplary search executed by a unified data integration system that searched through a repository of cost related fields.

The unified data integration system exposes the metadata dictionary or repository to a search engine. The search engine indexes the metadata, the associated data dictionaries, and the analyst's and/or various database administrator's comments (and/or recorded institutional domain knowledge) to transform unstructured data into a structured form that can be analyzed like it would be in a local central database. This pre-processing is useful when an analyst is searching for a specific field. For example, an analyst may be interested in executing a query that requires cost fields in "Database: Cost_report" and "Database: Cost_rebates." The analyst may understand where to access Database Cost_report and its elements but may not know where to find the cost-related field in the "Database Cost_rebates" which may be provided from another resource. Without knowing the various database structures or knowing the locations or addresses of the elements, the analyst may search for the word "cost" thereby listing data elements related to cost that may be aggregated through resource locators in the virtual data warehouse as shown by the virtual links represented in FIG. 2.

Figure 3:
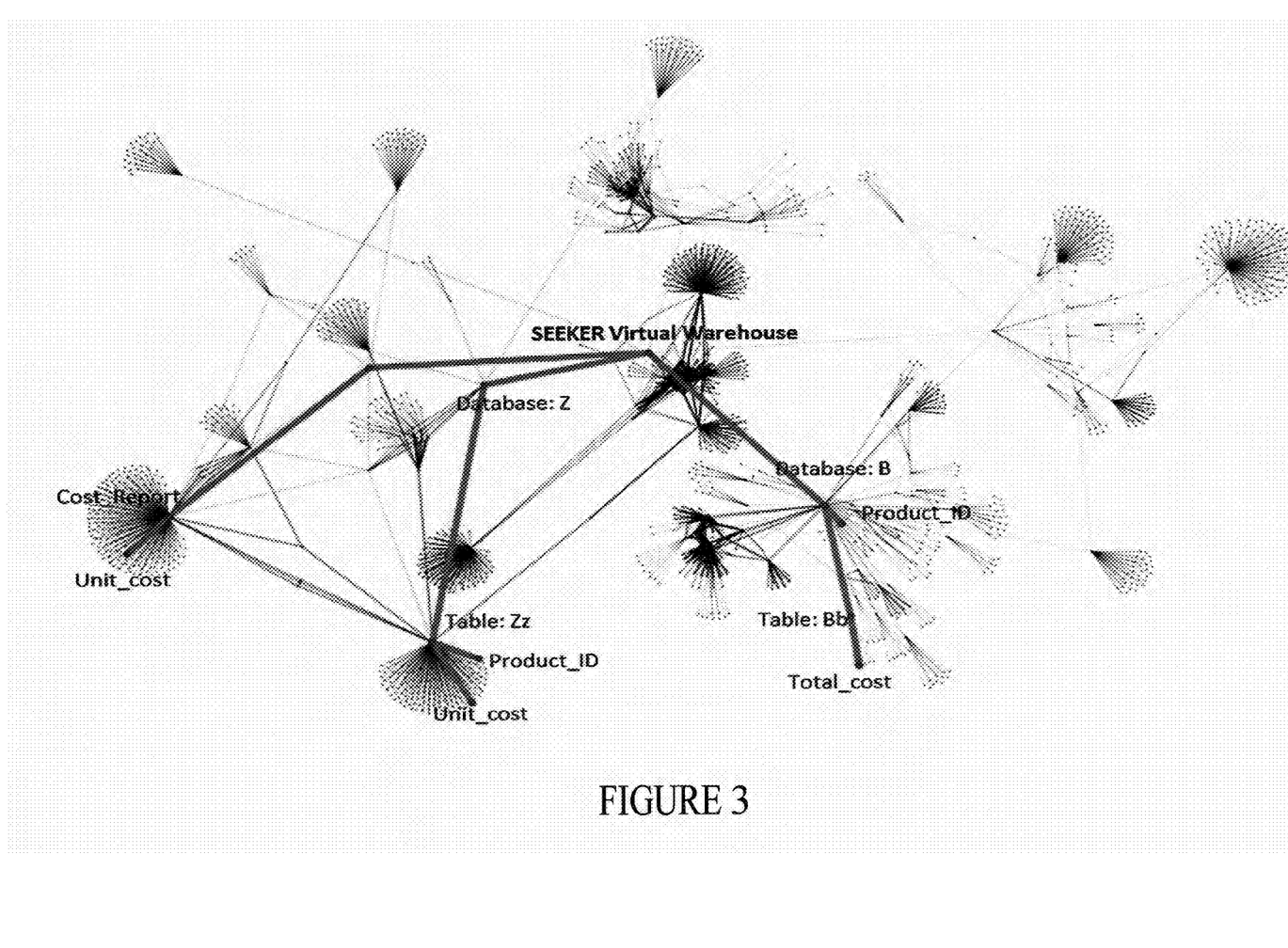
FIG. 3 shows the access paths and joined paths created by the unified data integration system when processing an exemplary search.

In operation, the unified data integration system may show clusters of data elements organized in tables, as well as how tables are organized in a database. A visual impression characteristic (e.g., such as red circular dots shown in FIG. 2) may indicate the hits of the metadata search on a display. Through a user interface like a touch screen or gesture controller, for example, the analysts may prune through the list of visual representations of potential fields or make selections, such as on a screen to be processed and the unified data integration system may identify the access path of the data to be analyzed. In some operations the unified data integration system automatically identifies schema crosswalk keys that show the equivalent elements (or "fields") in one or more database schemas and their access paths when an analyst wants to bring elements together as shown in FIG. 3. In use, the unified data integration system may automatically identify the primary key (an object that uniquely identifies each record in a table) in the system, the table, and databases to which the analyst requires access, and generate a table that joins data elements to be analyzed.

In the exemplary cost context described, an analyst may search for the object "unit_cost" to associate the "unit_cost" field with a "total_cost" field for selected products. The unified data integration system may identify both elements in different databases hosted by two different assets. As shown in FIG. 3, the visual impression characteristic (e.g., red line) marked on the graph is automatically generated. The "Product_ID" field is the primary key that associates the "unit_cost" and "total_cost" fields across the databases.

Besides the enhanced metadata search capabilities of the unified data integration system, some systems execute data level matching. The metadata and data level matching occurs when a database is loaded by or scraped by the unified data integration system. The unified data integration system may analyze each column to identify the distinct values collected per column, the percentage of the data that is distinct, the data type (number, date, etc.), structure (10-character string, mm-dd-yyyy), etc. The pre-processing or querying may generate profiles and histogram distributions of a random sample of data for each column. These values may be processed as features to match columns from two or more different schemas to create or emulate a virtual combined schema. Through scraping and an indexing the unified data integration system may generate schema-level hypotheses that makes content connections between previously unknown data sources. These hypotheses may then be accepted or rejected by an analyst rendering a unique virtual data warehouse to an analyst. In alternative unified data integration systems, the acceptance or rejections of the hypotheses may occur automatically (without human intervention) based on pre-programmed rules or through machine learning executed by alternative unified data integration systems that analyses and records analysts prior acceptance and/or rejections or programming.

Figure 4:
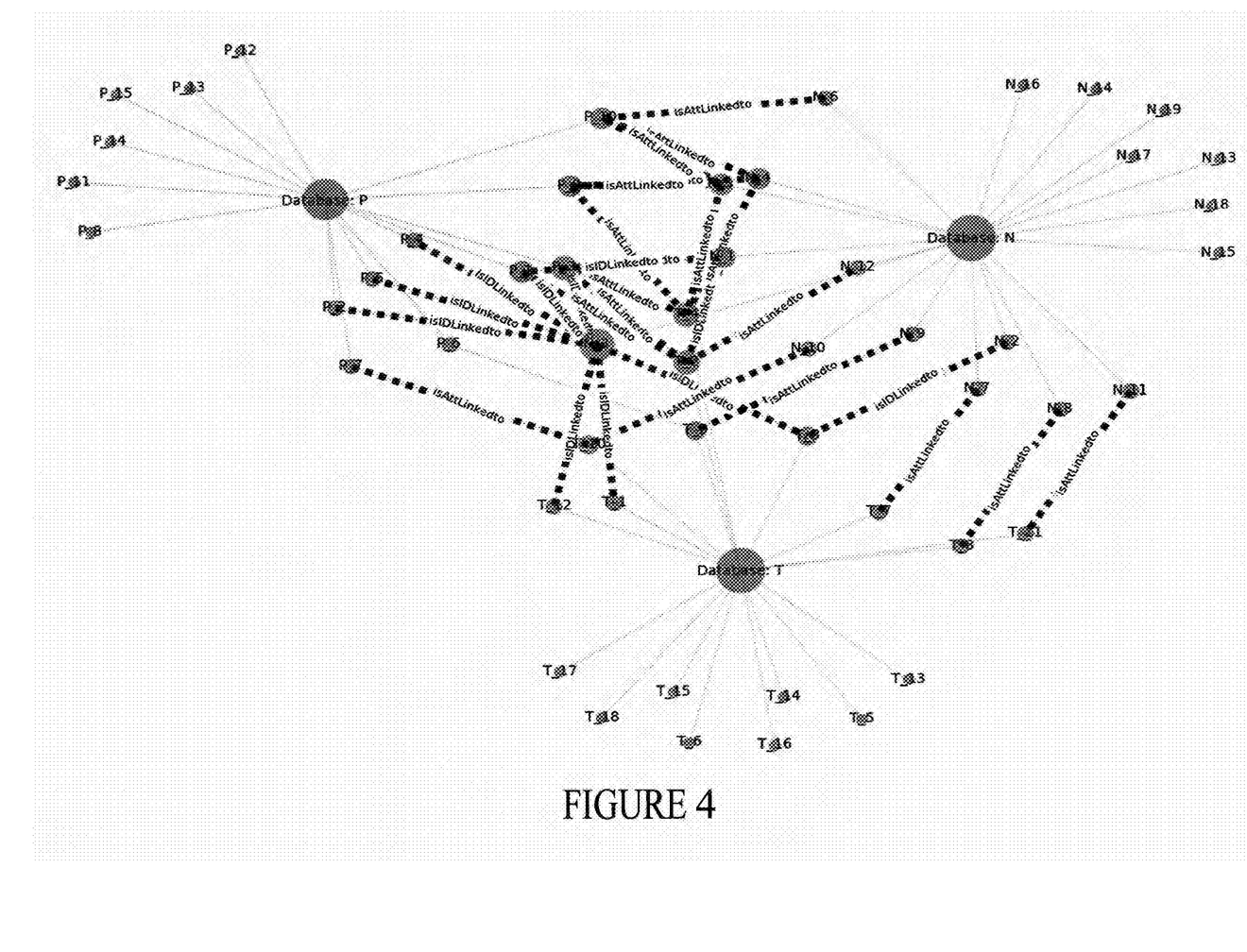
FIG. 4 shows the link hypotheses in dashed lines between potential related field elements based on a match by the name filed, data type, and a histogram of a random sample of data compared against the data source.

FIG. 4 a discovery result. In FIG. 4, an analyst is integrating three databases labelled "Database:P," "Database:N," and "Database:T." The analyst may select a few elements in each of these databases or allow the unified data integration system to process the dataset automatically. FIG. 4 shows how the unified data integration system automatically generates link hypotheses between potential field elements based on a match by the field name, data type and the histogram of a random sample of data compared against data sources.

The unified data integration system automatically extracts the elements that are potentially linkable across databases, creates those potential links, and visually represents those links on a display for an analyst. In the example shown in FIG. 4, the dark, dashed lines are hypothesis-generated by the unified data integration system. The unified data integration system hypothesize an ID-ID link type (e.g., "Product_ID" fields) from one database to another and attribute-attribute link types (e.g., fields like zip codes and phone numbers) based on a match by the field name, data type and the histogram of a random sample of data compared against data sources that was executed prior to the integration. Alternatively, the unified data integration system may hypothesize links based on column naming conventions and a fuzzy logic string matching of column names. This schema-level hypothesis generation functionality within the unified data integration system enables the analyst to build a virtual schema based on metadata and data-level matches. The associations and the business logic behind those associations can be shared and archived for collaboration with other analysts or may be programmed to be applied automatically.

Figure 5:
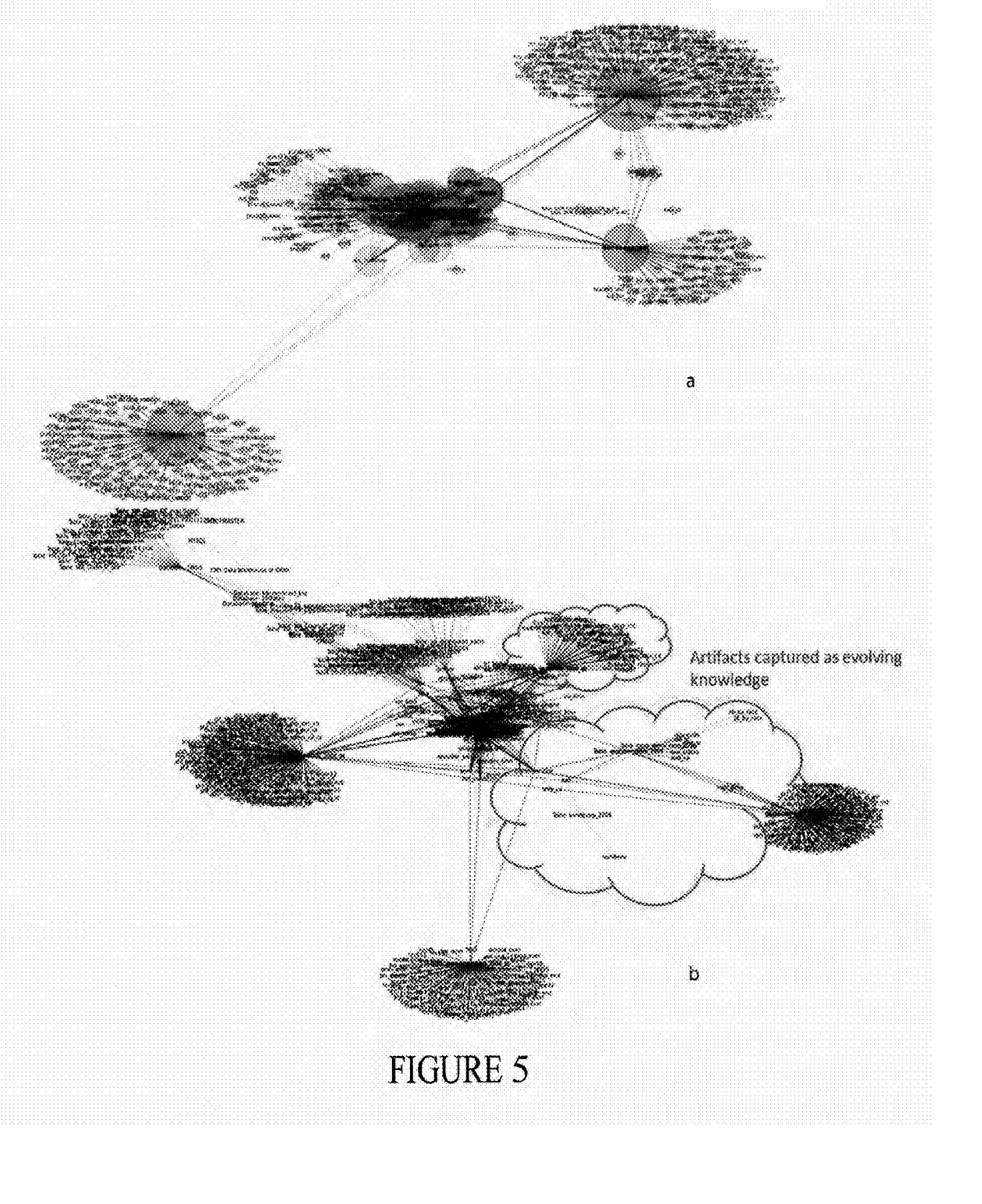
FIG. 5 shows a visual representation of the evolving knowledge recorder of the enterprise analytics.

The unified data integration system may record and store institutional domain knowledge. FIG. 5 shows screen shots of a representation of database and its associations taken several months apart. The upper portion of the drawing associated with the letter "a" is a visualization of the data schema when the database is first loaded into the warehouse. After analysts conducted their analysis, the schemas associated with the database transformed into the drawings associated with the letter "b". The schema changes, the analysis artifacts created, and the new calculations or reports are recorded, tracked, and stored automatically by the unified data integration system. The lower drawing associated with the letter "b" illustrates the modified schema after analysts collaborated. The stored information in memory (and in some cases databases) documents the provenance trail of reports and analysis artifacts, and it exposes data elements of value.

In FIG. 5, the structure of the graph reveals that there are three kinds of related processes captured in the database. The primary keys, foreign keys, and crosswalk keys. The lower drawing (associated with the letter "b") shows the captured interactions, collaborations of several analysts, and shows the other elements that are of value. An analyst not familiar with this data resource may quickly scan this snapshot to understand the key elements used in previous analysis, saving the computational time the analyst would have otherwise spent learning about the dataset.

The unified data integration systems allow users to explore and visualize different data sets together in a single view. The systems enables analysts to search for potential links in data sets generated by the unified data integrations system and allow analysts to virtually fuse or link data from different repositories together. The fuzzy logic matching capability may aid searching through schema for related information even if it is not directly related or previously linked. In addition, the graphic interactive display or display driver may render the relationships or display links that can be visually shown. Some unified data integration systems include social-media software modules that enable collaborations and conversations about datasets, business logic, and enterprise data workflows, and allow data analysts, data scientists and other stakeholders to collaboratively analyze disparate data sets remotely. Digital archives of exchanges of shared insights on the metadata may enrich the transferrable institutional knowledge. Alternative unified data integration systems render (1) a data analysis component or module that renders a display showing distribution of data values for an element, (2) a field linking based on data matching capability, and (3) provide a touch screen or gesture control application interface or controller that allow analysts to generate their own linkages between data sources by making selections and connections of visual objects that represent data sources on a display that may be electronically associated through simple touches, multi-touch or analyst gestures. The touch screen or and/or gesture controlled interface in some alternative unified data integration systems allows analysts to prune and/or validate (and in some applications pre-program) analyst generated or system generated hypotheses by touching the screen or by the analyst's motion (e.g., a gesture) made to express a thought that corresponds to a predefined act or behavior associated with hypotheses such as an acceptance or rejection of one or more hypotheses.

Some unified data integration systems connect and map massive amounts of institutional/enterprise data across disparate silos. By linking disparate data sets, the time required to integrate new data constructs for analysis is reduced. With these additions, an analyst may transmit insights, make comments, brainstorm about possibilities—and generate new questions of their own enabling analysts to know what data to link together.

To construct the automated, computationally tractable unified data integration systems, some systems first construct a collection of predefined semantic type objects (e.g., tokens, word sequences, social security numbers, etc.) that partition the collection of fields. The systems may then construct recursive computational processes that classify a field into a programmed semantic type and then build distributions for each field according to the field's type based on the values observed. The systems may then match fields based on their semantic types and learned distributions. This exemplary approach is computationally tractable. By processing fields independently, the work required is $O(n+m)$ rather than $O(nm)$ for comparing all pairs of entries within the two fields, for example.

A semantic type object can be viewed as a class of fields, such as a social security number, a phone number, an address, a word, a token, sequence of words, a variable length code, etc. In addition to semantic types, some unified data integration systems discover transformations that take one representation of the value (e.g., (865)555-5555) to another (e.g., 865-555-5555). Exemplary semantic types may include:
  a. token: categorical values with only a few distinct values (e.g., state names)
  b. word: sequence of characters with whitespace being rare (e.g., a last name)
  c. word sequence: multiple whitespace-separated words (e.g., a company name)
  d. fixed length codes: single-length strings of alphanumeric characters, with possible additional structure. (e.g., a social security number, a phone number, etc.)
  e. variable length codes: alphanumeric string of characters with variable length (e.g., ?)
  f. key: each field entry is unique (e.g., any primary key)

A classification process may determine the semantic type from field values. An exemplary decision tress may process a field by asking:
  1. How many different lengths the field values take?
     a. How many distinct entries does it have?
        i. All distinct: The field is a key
        ii. Mostly distinct: the field is a fixed length code
        iii. Few distinct: the field is a token
     b. Diverse range (variable length): Are there separating characters, such as dashes or whitespace?
        i. Yes, mainly whitespace: The field is a word sequence
        ii. Yes, typical punctuation sequence: The field is a variable length code
        iii. No: How many distinct entries are there?
           1. All distinct: The field is a key
           2. Mostly distinct: The field is a word
           3. Few distinct: The field is a token The distribution of each field may then be learned according to its semantic type. For a field with a fixed length code semantic type, the unified data integration systems may model the field as a collection of multinomial distributions, one for each position. To compute the parameters of this distribution, the unified data integration systems may count the number of occurrences of each character per position. The resulting multinomial distributions may also account for priors.

The field match candidates may be identified according to distribution similarities, which may involve both a semantic type comparison and a parameter comparison (e.g., Kullback-Leibler divergence). The field matching is $O(k^2)$ for k fields once the parameters and types have been learned, making this tractable. For two-letter state abbreviation identified as a token field type, for example, the distribution models the values as a multinomial. Comparison of two multinomials requires a computation of the standard KL-divergence formula.

In this example, the unified data integration systems used a collection of multinomial models, one for each position of the field, to model the semantic type. Other techniques may also be used such as matching based on meta-data alone. Depending on how strict the unified data integration must be, a match may be measured based on known similarity measures (synonyms or similarity metric like Levenstein). Unified data integration systems may process a number of values that agree between the fields and consider the properties of the format (e.g., length, position of punctuation, special characters). The unified data integration systems may consider the language modeling of values and consider the distribution of the collection of all characters across all values in field (bag of letters across all fields). Some unified data integration systems use Markov chain analysis, '2 gram' model and condition the probability of the next character of the previous character and consider position dependent—multinomial distribution 'bag of letters' model across the position of the fields. The systems may consider tokenized words separated by white spaces then do a 'bag of words' across all fields; and/or consider or use a combination of these processes.

Other unified data integration systems may comprise combinations of some or all of the structure and functions described above and/or shown in one or more or each of the figures or described in the provisional patent application, which refers to the unified data integration systems by the acronym SEEKER (Schema Exploration and Evolving Knowledge Recorder),which is incorporated by reference. The systems may be used to detect medical or Medicare fraud at the provider, referral, and/or patient level, health care informatics, and identify cost-care optimization, for example.

These systems are formed from combinations of structure and functions described or illustrated. The methods, devices, systems, and logic that control the operation of the unified data integration systems may be implemented in or may be interfaced in many other ways in many different combinations of hardware, software or both. Interaction with the computer may be accomplished via, for example, a connected keyboard, mouse, and/or monitor/display. All or parts of the system may be executed through one or more programs executed by controllers, one or more microprocessors (CPUs), one or more signal processors (SPU), one or more application specific integrated circuit (ASIC), one or more programmable media or combinations of such hardware. All or part of the systems may be implemented as instructions or programs stored on a non-transitory medium executed by a CPU/SPU/ASIC that comprises electronics including input/output interfaces, application program interfaces, and an up-dateable memory comprising at least a random access memory which is capable of being updated via an electronic medium and which is capable of storing updated information, processors (e.g., CPUs, SPUs, and/or ASICs) controller, an integrated circuit that includes a microcontroller or other processing devices that may execute software stored on a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, includes a specifically programmed non-transitory storage medium and computer readable instructions stored on that medium, which when executed, cause the control system to perform the specially programmed operations.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "analyst" encompasses a user that performs or executes an analysis. The term "substantially" or "about" may encompass a range that is largely, but not necessarily wholly, that which is specified. It encompasses all but a significant amount. When modules or components of the unified data integration systems are responsive to events, the actions and/or steps of devices, such as the operations that other devices are performing, necessarily occur as a direct or indirect result of the preceding events and/or actions. In other words, the operations occur as a result of the preceding operations. A device that is responsive to another requires more than an action (i.e., the device's response to) merely follow another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A computer implemented method of integrating data from remote disparate data sources comprising a non-transitory media, comprising programming for:
   detecting data sets in different formats having a plurality of fields hosted in a plurality of remote heterogeneous databases accessible through infrastructures that are coupled through a distributed network;
   extracting schema data of the plurality of remote heterogeneous databases;
   modeling each position of selected plurality of fields of the plurality of remote heterogeneous databases as a plurality of polynomials,
   identifying related fields in two or more of the plurality of remote heterogeneous databases by automatically hypothesizing data links based on column features that identify the number of distinct data items in each column in the plurality of remote heterogeneous databases and fuzzy logic matching that compares divergence of the plurality of polynomials; and
   linking the related fields automatically in the two or more of the plurality of remote heterogeneous databases through a virtual warehouse.

2. The computer implemented method of claim 1 further comprising displaying visual representations of relationship links of the related fields.

3. The computer implemented method of claim 1 further comprising capturing and publishing collaborative discussions about data associated with the related fields.

4. The computer implemented method of claim 1 further comprising scraping the schema data from the plurality of remote heterogeneous databases and generating a metadata repository.

5. The computer implemented method of claim 1 where the identification of the related fields occurs through a fuzzy logic.

6. The computer implemented method of claim 1 further comprising displaying visual representations of relationship links of the related fields and a user interface that allows a user to confirm or reject one or more of the relationship links.

7. The computer implemented method of claim 1 further comprising automatically identifying a plurality of crosswalk keys for identifying common fields in the plurality of remote heterogeneous databases.

8. The computer implemented method of claim 1 further comprising scraping the schema data from the plurality of remote heterogeneous databases and generating a metadata repository and a data level matching.

9. The computer implemented method of claim 1 further comprising generating profiles and histogram distributions of a random sample of data sampled from the plurality of remote heterogeneous databases before identifying the related fields of the databases.

10. The computer implemented method of claim 1 further comprising displaying visual representations of the relationship links of the related fields on a touch sensitive display programmed to accept the linking of the related fields if a user contact is detected that corresponds to a predefined gesture.

11. The computer implemented method of claim 1 further comprising displaying visual representations of the relationship links of the related fields on a touch sensitive display programmed to reject the linking of the related fields if a user contact is detected that corresponds to a predefined gesture.

12. A unified data integration system, comprising:
one or more processors;
a memory; and
one or more programs, where the one or more programs are stored in the memory and configured to be executed by the one or more processors, the programs including instructions for automatically:
   detecting data sets hosted in a plurality of heterogeneous databases that are coupled through a distributed network;
   extracting schema and relationship data from the plurality heterogeneous databases;
   generating polynomial models and histogram distributions of a random sample of data sampled from the plurality of heterogeneous databases;
   generating schema-level hypotheses that makes hypothetical content connections between previously unknown data sources accessed from at least two of the plurality heterogeneous databases to build a virtual schema based on the hypothetical content connections, an identified number of distinct data values in the plurality heterogeneous databases and fuzzy logic string matching that compares divergence between the polynomial models;
   automatically generating schema crosswalk keys that identify equivalent elements; and
   validating at least some of the schema-level hypotheses automatically.

13. The unified data integration system of claim 12 further comprising displaying visual representations of the schema-level hypotheses.

14. The unified data integration system of claim 12 further comprising capturing and publishing collaborative information about the data associated with the related fields.

15. The unified data integration system of claim 12 further comprising instructions for scraping the schema data from the plurality of heterogeneous databases and generating a metadata repository.

16. The unified data integration system of claim 12 where the generating schema-level hypotheses occurs through instructions that execute a fuzzy logic matching process.

17. The unified data integration system of claim 12 further comprising displaying visual representations of the schema-level hypotheses and a gesture control user interface that allows a user to confirm or reject one or more of the schema-level hypotheses in response to a gesture.

18. A method for analyzing a large data set from disparate sources using a computer, the method comprising:
   building a virtual schema of the data set in a memory of the computer automatically;
   modeling selected fields of a plurality of remote heterogeneous databases as polynomials;
   linking data elements automatically by hypothesizing links based between data elements based on naming conventions of remote data elements, identifying the number of remote distinct data elements, and fuzzy logic means that compares divergence between the polynomials; and
   displaying the data set visually on a monitor of the computer as an interconnected plurality of local databases and tables automatically.

19. The method of claim 18 and further comprising analyzing the displayed data set to find relationships across databases and tables.

20. The method of claim 18 further comprising generating profiles and histograms distributions of a random sample of data sampled from a plurality of heterogeneous databases.

* * * * *